July 12, 1949.                C. E. HOGAN ET AL                2,476,043
                               IMPULSE COUPLING
Filed June 21, 1947                                        2 Sheets-Sheet 1
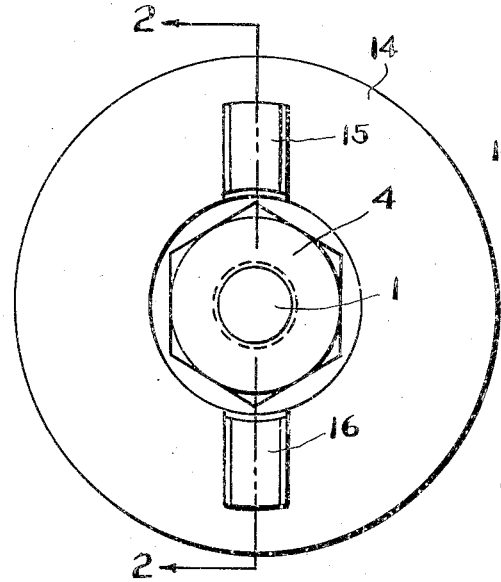
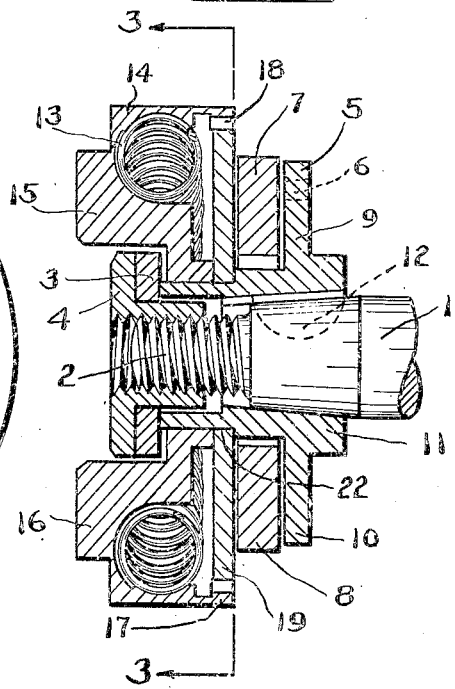
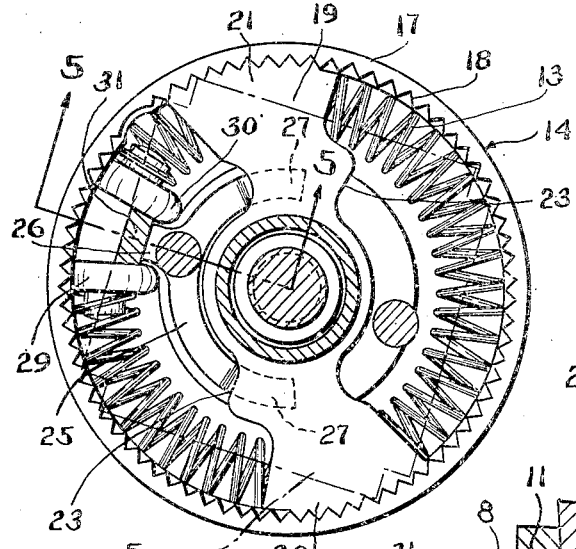
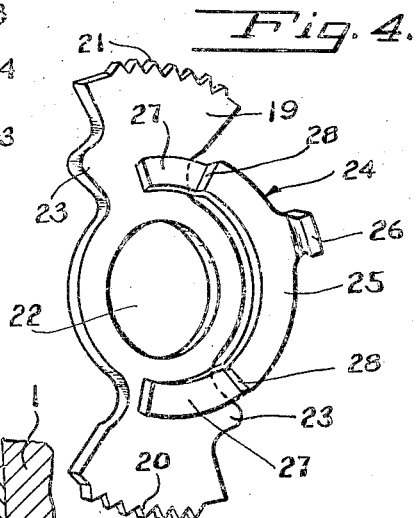
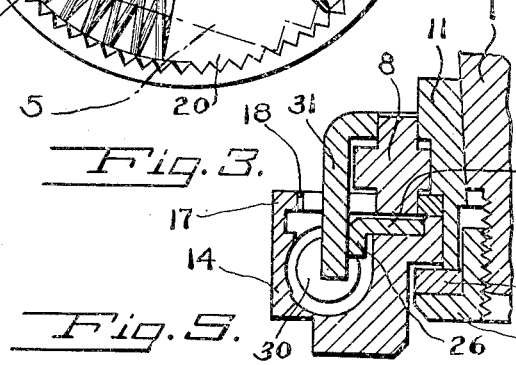
INVENTOR.
ERNEST E. STANSFIELD
CLARENCE E. HOGAN
BY
Raymond A. Paquin
ATTORNEY.

July 12, 1949.  C. E. HOGAN ET AL  2,476,043
IMPULSE COUPLING

Filed June 21, 1947  2 Sheets-Sheet 2

INVENTOR.
ERNEST E. STANSFIELD
CLARENCE E. HOGAN
BY
Raymond A. Paquin
ATTORNEY.

Patented July 12, 1949

2,476,043

UNITED STATES PATENT OFFICE 2,476,043

IMPULSE COUPLING

Clarence E. Hogan and Ernest E. Stansfield, Springfield, Mass., assignors to American Bosch Corporation, Springfield, Mass., a corporation of New York Application June 21, 1947, Serial No. 756,236

15 Claims. (Cl. 171—209)

This invention relates to new and useful improvements in impulse couplings for use with magnetos or electric generators adapted to supply ignition current to internal combustion engines and has particular reference to such a device wherein the driving lugs or tongues may be easily and quickly adjusted or positioned at desired angle to meet the requirements of the particular installation and which device is relatively simple and economical in construction yet efficient in operation.

In the application of a magneto having an impulse coupling secured thereto for facilitating starting of the engine, the driving lugs or tongues of the impulse coupling must engage a slot in the timing gear or drive member of the engine for operative connection therewith and as the timing gears of the engine are of necessity in fixed relation with the engine to properly time the same and the impulse coupling is in fixed relation with the magneto to which it is attached, considerable difficulty has been encountered in connecting the driving lugs or tongues of the impulse coupling with the slot provided for connection therewith in the engine timing gear.

In those cases where the magneto was of the base mounted type, it has been possible in some cases, although only with considerable difficulty, to adjust the driving lugs or tongues of the impulse coupling and the timing gear slot in order that they might engage. This has not been possible, however, with flange mounted magnetos and has required the providing of driving members or coupling flanges of impulse couplings with the lugs or tongues in numerous positions to insure the provision of the impulse coupling lugs at the proper angle for the particular installation. This has been further complicated by the fact that in some of the installations the arrangement was for clockwise rotation, whereas in others it was for anti-clockwise rotation, thus even further increasing the difficulties and the number of parts required to be able to accommodate all installations.

It is, therefore, the principal object of the present invention to provide an impulse coupling which is adapted for either flange mounted or base mounted magnetos and which is capable of adjustment to any desired angle to meet all desired installations and which requires only two parts, one for use where clockwise rotation is desired and another for use where anti-clockwise rotation is desired, and which construction is relatively simple and economical in construction yet efficient in operation.

Another object of the invention is to provide an impulse coupling of the type set forth which is formed of a minimum number of parts and which may be easily and quickly adjusted to locate the driving lugs or tongues at desired angular location for the particular installation.

Another object of the invention is to provide such a construction wherein the driving lugs or tongues may be adjusted to practically any desired angle thus providing a much wider range of adjustment than was possible with prior type constructions.

Other objects and advantages of the invention will be apparent from the following description taken in connection with the accompanying drawings. It will be understood that changes may be made in the details of construction and arrangement of parts shown and described, as the preferred form has been given by way of illustration only.

Referring to the drawings:

Fig. 1 is a front view of an impulse coupling embodying the invention;

Fig. 2 is a sectional view taken on line 2—2 of Fig. 1 looking in the direction of the arrows;

Fig. 3 is a sectional view taken on line 3—3 of Fig. 2 looking in the direction of the arrows;

Fig. 4 is a perspective view of the cam plate and adjusting member of the impulse coupling;

Fig. 5 is a sectional view taken on line 5—5 of Fig. 3 looking in the direction of the arrows.

Figure 6:
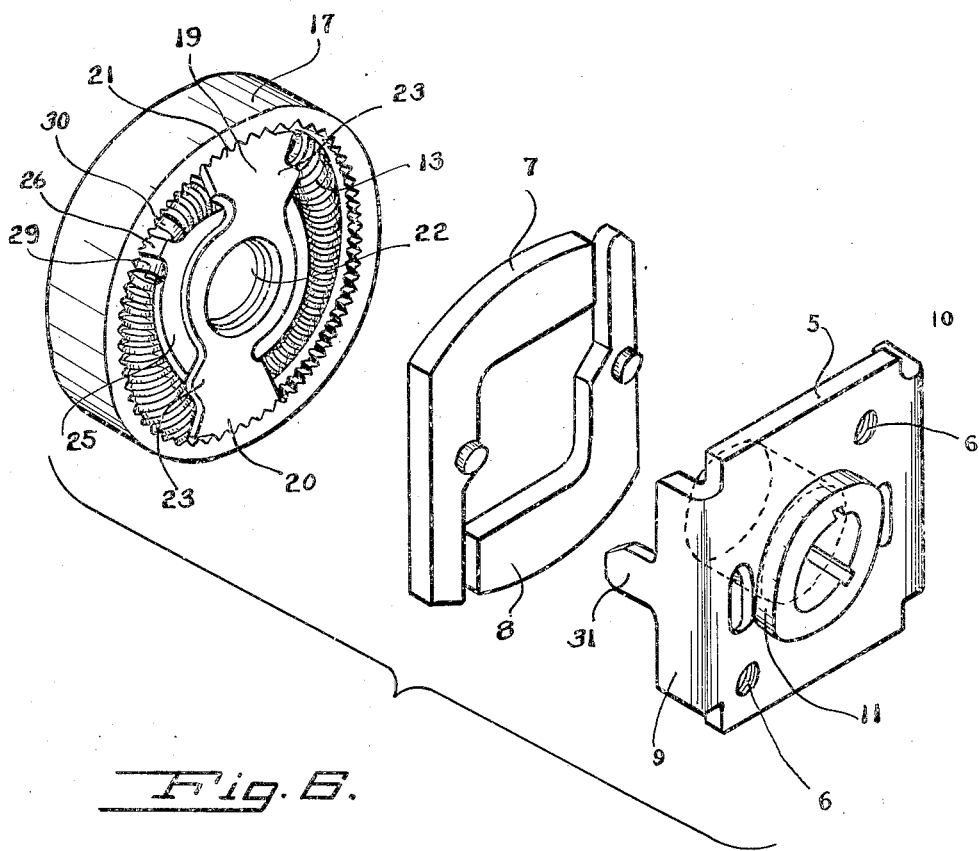
Fig. 6 is a perspective view of the parts in the relative positions they assume when assembled.

Referring more particularly to the drawings wherein similar reference characters designate corresponding parts throughout the several views, 1 designates the magneto shaft on which the impulse coupling is to be mounted and which has the threaded end 2 and the washer 3 and nut 4 which serve to retain the coupling on the shaft 1.

The arrester plate 5 of the coupling is provided with the usual openings 6 for bolting the coupling to the magneto housing. The coupling also contains the usual sliding weights 7 and 8 which are positioned on the flanges 9 and 10. The arrester plate 5 is journaled on the hub 11 which is keyed to the shaft 1 by the key 12.

The coupling is provided with the usual spiral or coil spring 13 in the housing 14 which housing has a central opening through which passes the hub 11.

The housing 14 is provided with the usual driving lugs or tongues 15 and 16 and also is provided with the upstanding wall 17 which wall has the serrated or gear toothed internal surface 18. It is pointed out that this toothed or serrated portion may extend throughout the entire extent of the portion 17 or only through a part thereof depending upon the extent of adjustment desired.

The cam plate 19 is of the same length as the diameter of the housing 14 and has the toothed or serrated portions 20 and 21 at its opposite ends with the serrations of teeth of such size as to engage or mesh with the teeth or serrations 18 on the lip 17 of the housing 14.

The cam plate 19 also is provided with the central opening 22 to allow its being positioned on the hub 11 as shown in Fig. 2.

The cam plate 19 has the usual cam portions 23 for actuating the weights of the impulse coupling in the usual manner.

The cam plate 19 is also provided with the adjusting member 24 which may be formed integral with the cam plate 19 or separately therefrom and secured thereto as shown in Fig. 4.

This adjusting member 24 comprises the member 25 having the adjusting lug 26 and having the end portions 27 deflected from the plane of the member 24 at 28 and with said deflected end portions 27 secured to the surface of the cam plate 19 by welding, soldering or other suitable process.

The adjacent ends of the coil spring 13 are provided with the abutment members 29 and 30 between which is positioned the adjusting member 26 on the cam plate 19.

The cam plate may be set at an angular position relative to the adjacent ends of the spring 13 depending upon the angular position of the slot in the timing gear and for this reason the spring 13 may be adjusted within the housing 14 to the approximate angular position necessary to position the driving lugs or tongues 15 in approximate desired angular position to engage the slot in the timing gear or driving member of the engine and then the cam plate 19 is positioned in the housing 14 with the toothed portions 20 and 21 in engagement with the toothed portions 18 on the interior of the portion 17 and with the axis of the cam plate at the desired position relative to the adjacent ends of the spring 13, and with the adjusting member 26 positioned between said abutment members 29 and 30 on the adjacent ends of the spring 13 and which member 26 serves to lock said spring in said adjusted position.

The usual key member 31 on the arrester plate 5 may then be inserted in the usual manner between the abutment members 29 and 30 and serves as a further stop in addition to the member 26 against which the spring may be wound or coiled in the usual manner.

The impulse coupling is of the sliding weight type and operates as follows:

As the shaft 1 revolves the spring 13, the plate 5 turns with it. As the weights 7 and 8 revolve into a vertical position, they drop of their own weight until the ends project outwardly of the arrestor plate 5 projecting beyond the opposite edges of the plate and engage stops on the magneto. As rotation continues, the stop retards the plate 5 and shaft 1 while the shaft of the coupling puts the spring 13 under tension. Next, the adjacent cam 23 on the member 19 engages the projection on the arrested catch and moves this catch upward. As soon as the weight is removed from the stop, the spring, now under tension, throws the plate 5 and the armature forward with the accelerated speed necessary to produce the spark. The same operation is repeated with the opposite catch or weight one-half of a revolution later and continues until the engine speed increases and centrifugal force, acting on the sliding weights, retains these arms in such positions that the free ends no longer come within range of the stop. Until this condition is reached, the armature of the magneto is arrested twice in each revolution and then thrown forward briskly enough to generate a strong sparking current, when if it rotated at no more than engine speed, the electrical energy generated would not be sufficient.

It will be seen that with the entire periphery of the portion 17 of the housing 14 provided with the serrations or teeth 18 adapted to engage the toothed portions 20 and 21 of the cam plate 19 that it is possible to adjust the position of the driving lugs to any desired position.

The cam plate 19 and adjusting member 24 shown are intended for use when the impulse coupling is intended for clockwise rotation. When the impulse coupling is desired for anti-clockwise rotation, it would be necessary to provide a cam plate such as the cam plate 19 with the member 24 secured on the opposite side of said plate 19 and extending in the opposite direction to that shown, thus with the device of the present invention and with the two cam plates as described, the driving lugs or tongues of the coupling could be adjusted to any desired angular position whether the impulse coupling is intended for clockwise or anti-clockwise rotation, thus requiring only two pieces to adjust the impulse coupling to fit all possible installations.

From the foregoing it will be seen that we have provided simple, efficient and economical means for obtaining all of the objects and advantages of the invention.

Having described our invention, we claim:

1. In a device of the character described, an annular housing, driving lugs on said housing for connection with an engine for operative connection therewith, a coil spring in said annular housing and surrounding the annulus in said housing and with the ends of said spring being normally urged toward each other, said spring being adjustable in said housing, said housing having serrated areas and a cam plate having serrations adjacent its opposite ends adapted to engage the serrated areas of said housing whereby said cam plate may be adjusted to various positions relative to said housing and said cam plate having a key adapted to be inserted between the adjacent ends of said coil spring.

2. In a device of the character described, an annular housing, driving lugs on said housing for connection with an engine for operative connection therewith, a coil spring in said annular housing and surrounding the annulus in said housing with the ends of said spring being normally urged toward each other, said spring being adjustable in said housing, said housing having gear toothed areas and a cam plate having gear teeth adjacent its opposite ends adapted to engage the gear toothed areas of said housing whereby said cam plate may be adjusted to various positions relative to said housing and said cam plate having a key adapted to be inserted between the adjacent ends of said coil spring.

3. In a device of the character described, an annular housing, driving lugs on said housing for connection with an engine for operative connection therewith, a coil spring in said annular housing and surrounding the annulus in said housing with the ends of said spring being normally urged toward each other, said spring being adjustable in said housing, said housing having serrated areas throughout the entire circumferential extent thereof and a cam plate having serrations adjacent its opposite ends adapted to engage the serrated areas on said housing at substantially any point throughout the entire circumferential extent thereof of said housing whereby said cam plate may be adjusted to various positions relative to said housing and said cam plate having a key adapted to be inserted between the adjacent ends of said coil spring.

4. In a device of the character described, an annular housing, driving lugs on said housing for connection with an engine for operative connection therewith, a coil spring in said annular housing and surrounding the annulus in said housing and with the ends of said spring being normally urged toward each other and said spring being adjustable in said housing, said housing having gear toothed areas throughout the entire circumferential extent thereof and a cam plate having gear teeth adjacent its opposite ends adapted to engage the gear toothed areas throughout the entire circumferential extent thereof of said housing whereby said cam plate may be adjusted to various positions relative to said housing and said cam plate having a key adapted to be inserted between the adjacent ends of said coil spring.

5. In a device of the character described, an annular housing, driving lugs on said housing for connection with an engine for operative connection therewith, a coil spring in said annular housing and surrounding the annulus in said housing and with the ends of said spring being normally urged toward each other and said spring being adjustable in said housing, said housing having serrated areas and a cam plate having serrations adjacent its opposite ends adapted to engage the serrated areas of said housing whereby said cam plate may be adjusted to various positions relative to said housing and said cam plate having a key adapted to be inserted between the adjacent ends of said coil spring, said key member comprising an arc shaped member having its ends secured to said cam plate and with its body offset from the plane of said cam plate.

6. In a device of the character described, an annular housing, driving lugs on said housing for connection with an engine for operative connection therewith, a coil spring in said annular housing and surrounding the annulus in said housing and with the ends of said spring being normally urged toward each other and said spring being adjustable in said housing, said housing having gear toothed areas and a cam plate having gear teeth adjacent its opposite ends adapted to engage the gear toothed areas of said housing whereby said cam plate may be adjusted to various positions relative to said housing and said cam plate having a key adapted to be inserted between the adjacent ends of said coil spring, said key member comprising an arc shaped member having its ends secured to said cam plate and with its body offset from the plane of said cam plate.

7. In a device of the character described, an annular hollow housing having driving lugs for engagement with an engine for operative connection therewith, a spring in said housing surrounding the annulus therein and with the ends of said spring normally urged in a direction toward each other, said housing having an upstanding lip with said lip having inwardly facing serrations and a cam plate having serrations adjacent the opposite ends thereof adapted to engage the serrations on said lip to allow the positioning of said cam plate relative to said housing to place the driving lugs at desired angular relation to said cam plate.

8. In a device of the character described, an annular hollow housing having driving lugs for engagement with an engine for operative connection therewith, a spring in said housing surrounding the annulus therein and with the ends of said spring normally urged in a direction toward each other, said housing having an upstanding lip with said lip having inwardly facing gear teeth and a cam plate having gear teeth adjacent the opposite ends thereof adapted to engage the gear teeth on said lip to allow the positioning of said cam plate relative to said housing to place the driving lugs at desired angular relation to said cam plate.

9. In a device of the character described, an annular hollow housing having driving lugs for engagement with an engine for operative connection therewith, a spring in said housing surrounding the annulus therein and with the ends of said spring normally urged in a direction toward each other, said housing having a circumferential upstanding lip with said circumferential lip having inwardly facing serrations and a cam plate having serrations adjacent the opposite ends thereof adapted to engage the serrations on said circumferential lip to allow the positioning of said cam plate relative to said housing to place the driving lugs at desired angular relation to said cam plate.

10. In a device of the character described, an annular housing, driving lugs on said housing for connection with an engine for operative connection therewith, a coil spring in said annular housing and surrounding the annulus in said housing and with the ends of said spring being normally urged toward each other and said spring being adjustable in said housing, said housing having a plurality of securing means and a cam plate having portions adjacent its opposite ends adapted to engage any of the securing means of said housing whereby said cam plate may be adjusted to various positions relative to said housing and said cam plate having a key adapted to be inserted between the adjacent ends of said coil spring.

11. In a device of the character described, an annular housing, driving lugs on said housing for connection with an engine for operative connection therewith, a coil spring in said annular housing and surrounding the annulus in said housing and with the ends of said spring being normally urged toward each other and said spring being adjustable in said housing, said housing having a plurality of sets of securing means and a cam plate having portions adjacent its opposite ends adapted to engage any of said sets of securing means of said housing whereby said cam plate may be adjusted to various positions relative to said housing and said cam plate having a key adapted to be inserted between the adjacent ends of said coil spring.

12. In a device of the character described, an annular housing, driving lugs on said housing for connection with an engine for operative connection therewith, a coil spring in said annular housing and surrounding the annulus in said housing and with the ends of said spring being normally urged toward each other and said spring being adjustable in said housing, said housing having securing means throughout the entire circumferential extent thereof and a cam plate having means adjacent its opposite ends adapted to engage the securing means on said housing at any point throughout the entire circumferential extent thereof of said housing whereby said cam plate may be adjusted to various positions relative to said housing and said cam plate having a key adapted to be inserted between the adjacent ends of said coil spring.

13. In a device of the character described, an annular hollow housing having driving lugs for engagement with an engine for operative connection therewith, a spring in said housing surrounding the annulus therein and with the ends of said spring normally urged in a direction toward each other, said housing having an upstanding lip with said lip having a plurality of securing means and a cam plate having means adjacent the opposite ends thereof adapted to engage any of the securing means on said lip to allow the positioning of said cam plate relative to said housing to place the driving lugs at desired angular relation to said cam plate.

14. In a device of the character described, an annular hollow housing having driving lugs for engagement with an engine for operative connection therewith, a spring in said housing surrounding the annulus therein and with the ends of said spring normally urged in a direction toward each other, said housing having an upstanding lip with said lip having inwardly facing securing means and a cam plate having means adjacent the opposite ends thereof adapted to engage the securing means on said lip to allow the positioning of said cam plate relative to said housing to place the driving lugs at desired angular relation to said cam plate.

15. In a device of the character described, an annular hollow housing having driving lugs for engagement with an engine for operative connection therewith, a spring in said housing surrounding the annulus therein and with the ends of said spring normally urged in a direction toward each other, said housing having a circumferential upstanding lip with said circumferential lip having securing means substantially throughout the full extent thereof and a cam plate having means adjacent the opposite ends thereof adapted to engage any of the securing means on said circumferential lip to allow the positioning of said cam plate relative to said housing to place the driving lugs at desired angular relation to said cam plate.

CLARENCE E. HOGAN.
ERNEST E. STANSFIELD.

REFERENCES CITED

The following references are of record in the file of this patent:

UNITED STATES PATENTS

| Number | Name | Date |
|---|---|---|
| 1,788,062 | Martin | Jan. 6, 1931 |